United States Patent [19]

Monroe et al.

[11] Patent Number: 4,882,564
[45] Date of Patent: Nov. 21, 1989

[54] REMOTE TEMPERATURE MONITORING SYSTEM

[75] Inventors: Paul Monroe, Janesville, Wis.; James Kurth, Hopkins, Minn.

[73] Assignee: Monitech Corporation, Minn.

[21] Appl. No.: 202,199

[22] Filed: Jun. 6, 1988

[51] Int. Cl.⁴ .................. B60Q 1/00; G01K 11/00
[52] U.S. Cl. .................... 340/449; 340/501; 340/870.17; 340/525; 340/585; 340/588; 374/170; 364/557
[58] Field of Search .............. 340/57, 585, 449, 501, 340/870.17, 870.26, 525, 588, 589; 331/66; 374/170, 102, 104, 183, 185; 364/557

[56] References Cited

U.S. PATENT DOCUMENTS

| 3,689,888 | 9/1972 | Wootton | 340/164 R |
| 3,848,231 | 11/1974 | Wootton | 340/164 R |
| 4,024,495 | 5/1977 | O'Brien | 340/57 |
| 4,030,363 | 6/1977 | Halleck | 73/362 AR |
| 4,031,513 | 6/1977 | Simciak | 340/152 |
| 4,232,682 | 11/1980 | Veth | 374/170 |
| 4,278,841 | 7/1981 | Regennitter et al. | 179/5 R |
| 4,385,289 | 5/1983 | McMillan | 340/585 |
| 4,448,549 | 5/1984 | Hashimoto et al. | 374/170 |
| 4,455,096 | 6/1986 | Brandstedt | 374/170 |
| 4,562,554 | 12/1985 | Stixrud et al. | 364/900 |
| 4,582,280 | 4/1986 | Nichols et al. | 246/182 R |

FOREIGN PATENT DOCUMENTS

| 0930021 | 5/1982 | U.S.S.R. | 374/170 |
| 1027534 | 7/1983 | U.S.S.R. | 374/170 |
| 1328688 | 8/1987 | U.S.S.R. | 374/170 |
| 2157515 | 10/1985 | United Kingdom | 374/170 |

Primary Examiner—Donnie L. Crosland

[57] ABSTRACT

A remote temperature sensing and warning system for a temperature controlled vehicle comprising a remote temperature sensing unit for measuring the temperature in the transport container and transmitting the temperature signal within a repeating time frame through the existing vehicle wiring to a remote receiver; the receiver decoding and converting the signal into a displayable form to continuously display the current temperature of the transport container; the receiver further detecting out of range temperatures and signal transmission errors and providing visual and aural alarms therefrom.

6 Claims, 1 Drawing Sheet

REMOTE TEMPERATURE MONITORING SYSTEM

BACKGROUND OF THE INVENTION

1. Field of the Invention

The present invention pertains to a system for remotely monitoring temperature, and more particularly to a system for monitoring the temperature in heated or refrigerated trailers during transit to prevent the spoilage of a perishable cargo caused by temperature fluctuations.

2. Description of the Prior Art

An important requirement in transporting goods requiring a controlled environment is communicating the variances and failures of the environmental control device to outside persons to make the necessary corrections or repairs. More specifically, when transporting perishable foodstuffs and the like the temperature in the transport container must be controlled to prevent spoilage of the cargo. While current refrigeration technology is quite reliable, equipment failures and changes in the ambient temperature do cause the temperature in the container to change, becoming either too warm or too cold thereby causing spoilage of the cargo and substantial monetary loss. Frequently, the driver is unaware of the temperature changes and continues to operate for some time while the cargo is spoiling and losses are increasing.

Previously, monitors of the temperature of a refrigerated container have ranged from simple gauges having a sensor disposed within the container and an external readout means which often required the driver to stop and climb up on the truck to read the gauge which provided no method whereby the driver could determine the temperature while in motion. U.S. Pat. No. 4,455,096 issued June 19, 1984 to Brandstedt is an improvement by providing an externally readable display so as the driver can see the temperature readout while the vehicle is in motion. Brandstedt, though, has the dual disadvantages of requiring holes to be made in the container to access its sensor and requiring the driver to periodically read the display, as no out of range alarm is provided.

U.S. Pat. No. 4,024,495 issued May 17, 1977 to O'Brien discloses an improvement over Brandstedt by placing the temperature sensor in the refrigerated unit and the detector in the cab with the driver. O'Brien, however, requires a linear electrical transducer, a device difficult to obtain and usually quite expensive; and further is an analog device with a drifting calibration due to the changes in power source and aging of the components.

SUMMARY OF INVENTION

The present invention is a remote temperature sensing and alarm system for a refrigerated or heated transport container and the like. The system comprises a temperature sensor and a transmitter unit located in the transport container and a display and alarm receiver unit remote from the temperature sensing unit. The receiver alarm unit includes a display means for continuous display of the temperature detected by the transmitter unit, an alarm providing visual and aural signal when the sensed temperature is out of range, and alarm signals indicating equipment malfunction.

OBJECTS OF THE INVENTION

It is an object of the invention to provide a temperature sensing and monitoring device that can be readily installed in existing vehicles.

It is another object of the invention to remotely monitor the temperature of a cargo containing transport container.

It is a further object of the invention to provide a remote temperature change alarm for alerting the driver before the temperature in the transport container deviates sufficiently to cause substantial degradation of the cargo.

It is a further object of the invention to provide a remote display and alarm unit operable with any one of the many sensor units wherein any transport container may be connected to any powered unit having a remote display and alarm unit for operation.

DESCRIPTION OF THE PREFERRED EMBODIMENT

Figure 1:
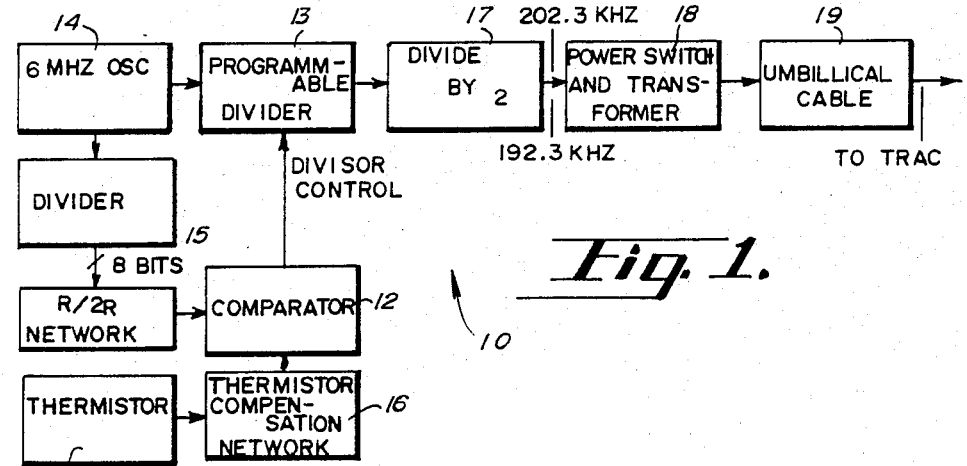
FIG. 1 is a functional block drawing of the preferred embodiment of the remote temperature sensor unit of the present invention.

Referring now to FIG. 1. of the drawings generally, the transmitter unit 10 measures the temperature measured using a temperature sensor 11, such as thermistor or alike, the output therefrom is compared to a repeating reference ramp voltage changing the output state of the transmit comparator 12. The output signal of the transmit comparator 12 is communicated to the input of a programmable divider 13 toggling the output of the divider between the two frequencies thereof. The divider output signal is thence placed in its modulated form on the existing wiring of the vehicle.

Figure 3:
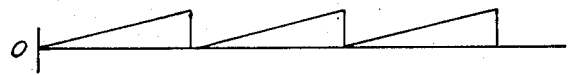
FIG. 3 is a graph showing the output voltage of the ramp voltage generator.

More particularly, the transmit unit 10 is powered from the existing vehicle wiring, not shown, and begins by generating a fixed reference frequency using an oscillator 14 of well known technology, preferably a 5 MHz. quartz crystal oscillator. The output of oscillator 14 is first divided down to a convenient frequency and communicated to an R/2R network 15 for generating a repeating ramp voltage as shown in FIG. 3 which also functions as a time frame. It should be noted that periodic increasing of the ramp voltage is then repeated and the time from the one zero point to the next zero is reproduced. The ramp voltage output of the R/2R network 15 is thence communicated to a second input of the transmit comparator 12.

Figure 4:
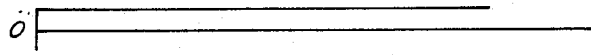
FIG. 4 is a graph showing the conditioned output voltage of the temperature sensor.

The temperature sensor 11 generates an output voltage dependent on the temperature at its location. This output voltage need only vary as the temperature changes, the voltage change need not be linear, or for that matter describable even by a mathematical function. The output of the temperature sensor 11 is first communicated to a compensation network 16 which serves to stabilize, remove noise, and generally scale the output signal so as to be suitable for input as a first input to transmit comparator 12 as shown in FIG. 4.

Figure 5:
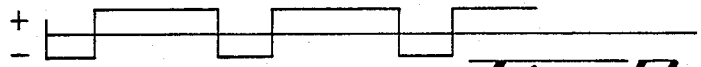
FIG. 5 is a graph showing the output of the transmit comparator.

The transmit comparator 12 compares its first input from compensation network 16 with its second input from R/2R network 15. Beginning with the ramp voltage from the first input at zero, the output of the transmit comparator 12 is low. As the ramp voltage at the first input increases, it exceeds the compensation network 16 voltage at the first input and the output of the comparator changes state and goes high as shown in FIG. 5. Additionally, a time frame is produced by the transmit comparator 12 beginning from the point where the output signal goes low. The time frame is repeatedly produced. This logical output of the transmit comparator 12 is communicated to the programmable divider 13.

The programmable divider 13 takes as its first input, the output of the oscillator 14 and as its second input the output of transmit comparator 12. The frequency of the first input is divided by an integer number settable by the logical level of the second input. In the preferred embodiment, the programmable divider 13 will divide by thirteen when the second input is low and divide by twelve when the second input is high. Thus, with a 5 MHz. input signal, the output of the programmable divider will be 384.6 KHz while the second input is low and 416.6 KHz when the second input is high.

The output of the programmable divider 13 is further communicated to a divider 17 where the frequency is divided by two to obtain a frequency that is more convenient to transmit. Thus after dividing by two, the output will be either 192.3 KHz. or 208.3 KHz. dependant upon the logical state of the transmit comparator 12. This output is known in the art as Frequency Shift Keyed (FSK).

The output of the divider 17 is communicated to a transformer 18 where the FSK signal is matched to a direct current line and is modulated onto current line 19 in the existing wiring of the transport container.

Figure 2:
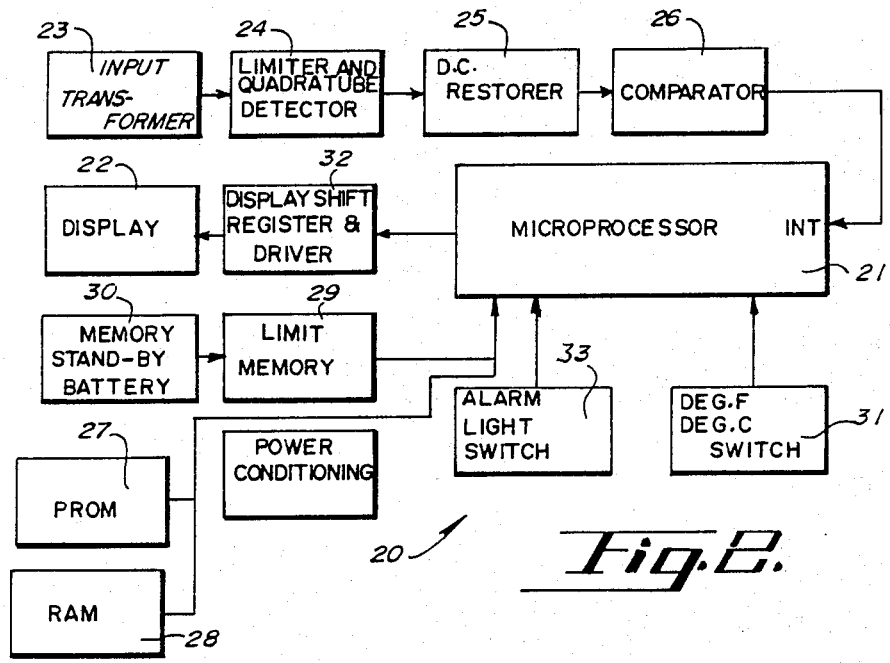
FIG. 2 is a functional block drawing of the preferred embodiment of the display and alarm remote of the present invention.

Referring now to FIG. 2. of the drawings generally, the receiver unit 20 receives the signal of the transmit unit 10 from the direct current line 19 of the vehicle wiring, the received signal is conditioned and restored to the logical signal level which follows the output of transmit comparator 12. Thus, when the signal goes to a low state it triggers an interrupt in the microprocessor 21. The microprocessor 21 measures the time the input signal remains low and converts that time to a temperature. This temperature signal is output to the visual display 22 and compared to the alarm limits for possible triggering of the alarm contained in the display 22.

More particularly, the input from the direct current line 19 is first passed through a transformer where the high frequency signal is segregated from the direct current component. The transformer output is thence communicated to the detector 24 where the frequency and frequency shifts are detected. The detector 24 is preferably a limiter/quadrature detector circuit of conventional design which is well known in the art.

The output of the detector 24 is communicated to the D.C. restorer 25 where the frequency shifts are restored to the logical direct current states as were produced from the output of transmit comparator 12 as shown in FIG. 5. The output of the restorer 25 is communicated to a receive comparator 26 which changes logical state following the input from the restorer 25 the output therefrom is communicated to the microprocessor 21.

Microprocessor 21 is preferably a "single chip" microprocessor such as a Motorola model 6805 which includes the microprocessor section with read only memory (ROM) 27, random access memory (RAM) 28, and a clock, not shown, all integral on one chip. The ROM 27 is used to store program instructions and data. The RAM 28 is used while the microprocessor 21 is operating to store intermediate results and data.

The low going signal from the receive comparator 26 is received by the microprocessor 21 triggering an interrupt therein. Microprocessor 21 notes the time of the interrupt and counts until the interrupt clears, that is, the input from restorer 25 returns to a high state. The time so measured by the microprocessor 21 is then compared with the set of values stored in a look up table to convert the time value to a temperature value.

The microprocessor then compares the temperature value found with the upper and lower temperature values previously stored in the limit memory 29. The limit memory 29 can be any type of memory that can be repeatedly written to and is preferably complimentary metal oxide substrate (CMOS) static RAM for memory retention and low current draw when powered by a back up battery 30.

When the temperature so determined is within the limits set in the limit memory 29 for a predetermined length of time the microprocessor 21 will proceed. When the temperature so determined is not within the limits set in the limit memory 29 a signal is generated and communicated through the display driver 32 to the display 22 which displays a visual alarm and sounds an aural alarm.

The alarm limits may set or changed using the limit switch 33. The limit switch 33 is preferably a three position spring loaded center off toggle switch readily available from numerous suppliers. The temperature limits may be reset by moving the limit switch 33 from its "center off" holding the limit switch 33 therefrom until the display 22 shows the desired temperature limit. This desired temperature limit will be stored in the limit memory 29.

Microprocessor 21 additionally measures the time between successive interrupts from receive comparator 26 to determine if the time therebetween is 256 clock cycles. When the time between interrupts from the receive comparator 26 is incorrect, the temperature value is discarded and the display 22 is not updated. A delay is imposed by microprocessor 21 before signalling a transmission fault to allow for signal noise and other random events. If the fault status persists for more than the delay period, preferably one second, the microprocessor 21 will initiate the generation of a unique alarm signal for display on the display 22 and continue this display until the fault is corrected or reset.

The microprocessor 21 then determines the status of the Fahrenheit/Celsius switch 31 and converts the temperature to the proper scale. The scaled temperature value is transmitted to the display driver 32 for transmission to the display 22. The microprocessor 21 continuously reads the value transmitted from the temperature sensor 11 and updates the display 22 while checking for faults within the system.

Although the present invention has been described in considerable detail in the above specifications, it is not intended that the invention be limited to such detail, except as may be necessitated by the appended claims.

What we claim is:

1. A remote temperature sensor and alarm system for a temperature controlled vehicle comprising:

a. a fixed rate oscillator;

b. means for sensing temperature said sensing means producing a temperature related electrical output;

c. means producing an analog repeating ramp voltage time frame synchronous with said oscillator;

d. a transmitter comparator receiving the output of the temperature sensing means as a first input and the analog ramp voltage as a second input said transmitter comparator producing a low output while the first input exceeds the second input and a high output while the second input exceeds the first input;

e. a programmable divider receiving a first input from the oscillator and a second input from the transmit comparator said programmable divider producing an output of a first frequency while the second input is low and an output of a second frequency while the second input is high;

f. a transmitter receiving the programmable divider output, said transmitter conditioning and transmitting said first and second frequencies;

g. a receiver receiving said first and second frequencies; said receiver conditioning said frequencies for transmission therefrom;

h. a processor unit receiving the said conditioned first and second frequencies from said receiver and decoding from each of the said transmitted time frames a temperature value;

i. a means for displaying said temperature value received from said processor unit.

2. The invention as disclosed in claim 1 wherein the means sensing temperature is a thermistor.

3. The invention as disclosed in claim 1 wherein the time frame is modulated onto the existing wiring at frequencies between 150 kilohertz and 400 kilohertz.

4. The invention as disclosed in claim 3 wherein the first modulated frequency is approximately 192 kilohertz and the second modulated frequency is approximately 208 kilohertz.

5. The invention as disclosed in claim 1 wherein the processor is a single chip microprocessor.

6. A remote temperature sensor and alarm system for a temperature controlled vehicle comprising:

a. a transmitting unit disposed in a movable transport container comprising:

means for sensing temperature and electrically communicating a temperature value voltage to a first comparator; means for producing a time dependent repeating analog ramp voltage and communicating the ramp voltage to the first comparator, said first comparator producing a logical low output when the temperature value voltage exceeds the ramp voltage and producing a logical high output when the ramp voltage exceeds the temperature value voltage; a modulator means receiving the first comparator output and converting said output to one of two discrete frequencies and further modulating said discrete frequencies onto a direct current carrying line and transmitting therefrom;

b. a receiving unit disposed remotely from said transmit unit and connected to said direct current carrying line comprising:

means for communicating with the direct current carrying line demodulating said discrete frequencies therefrom; means for receiving said discrete frequencies and converting said discrete frequencies to logical levels; a microprocessor receiving the logical levels and comparing the times of each level with previously set values to determine a temperature value, the temperature value further being compared with setable upper and lower temperature limits and when said temperature value is not within said temperature limits triggering an audible and visual alarm, the temperature value being further visually displayed on a display unit, the microprocessor further comparing the timing of the logical levels with a time reference and producing a transmission error signal when the timing of said logical levels are not within said time reference.

* * * * *